United States Patent
Schottler et al.

(10) Patent No.: US 10,259,748 B2
(45) Date of Patent: Apr. 16, 2019

(54) USE OF AQUEOUS EMULSIONS BASED ON PROPYLETHOXYSILANE OLIGOMERS AS AN ADDITIVE IN HYDRAULICALLY SETTING CEMENT COMPOSITIONS FOR REDUCTION OF SHRINKAGE CHARACTERISTICS

(71) Applicant: Evonik Degussa GmbH, Essen (DE)

(72) Inventors: Michael Schottler, Bischofsheim (DE); Christine Fliedner, Bonn (DE); Thomas Roehrig, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/594,001

(22) Filed: May 12, 2017

(65) Prior Publication Data
US 2017/0327422 A1   Nov. 16, 2017

(30) Foreign Application Priority Data
May 12, 2016   (EP) ..................... 16169271

(51) Int. Cl.
| | | |
|---|---|---|
| *C04B 24/42* | (2006.01) | |
| *C04B 24/16* | (2006.01) | |
| *C04B 7/345* | (2006.01) | |
| *C04B 40/00* | (2006.01) | |
| C04B 103/00 | (2006.01) | |
| C04B 103/67 | (2006.01) | |
| C04B 111/34 | (2006.01) | |
| C04B 103/56 | (2006.01) | |
| C04B 111/60 | (2006.01) | |

(52) U.S. Cl.
CPC .............. *C04B 24/42* (2013.01); *C04B 7/345* (2013.01); *C04B 24/16* (2013.01); *C04B 40/0039* (2013.01); *C04B 2103/0048* (2013.01); *C04B 2103/58* (2013.01); *C04B 2103/67* (2013.01); *C04B 2111/34* (2013.01); *C04B 2111/346* (2013.01); *C04B 2111/60* (2013.01)

(58) Field of Classification Search
CPC ..... C04B 24/42; C04B 2103/67; C04B 24/16; C04B 40/0039; C04B 2103/61; C04B 22/106; C04B 24/122; C04B 14/066; C04B 14/104; C04B 2103/40; C04B 2103/44; C04B 24/003; C04B 24/04; C04B 24/10; C04B 24/32; C04B 2103/0048; C04B 2103/58; C04B 2111/34; C04B 2111/346; C04B 2111/60; C04B 7/345

See application file for complete search history.

(56) References Cited

U.S. PATENT DOCUMENTS

| | | | |
|---|---|---|---|
| 8,394,885 B2 * | 3/2013 | Friedel | .................. C04B 41/009 524/261 |
| 2002/0086907 A1 | 7/2002 | Standke et al. | |
| 2007/0144406 A1 | 6/2007 | Zampini | |
| 2008/0188617 A1 | 8/2008 | Standke et al. | |
| 2011/0124794 A1 * | 5/2011 | Friedel | .................. C04B 41/009 524/506 |

FOREIGN PATENT DOCUMENTS

| | | |
|---|---|---|
| EP | 1 205 505 A2 | 5/2002 |
| KR | 20100044494 A | 4/2010 |
| SU | 833787 A1 | 5/1981 |
| WO | WO 2004/089846 A1 | 10/2004 |
| WO | WO 2006/081891 A1 | 8/2006 |

OTHER PUBLICATIONS

Partial European Search Report dated Oct. 18, 2016 in Patent Application No. EP 16169271.

* cited by examiner

*Primary Examiner* — Shuangyi Abu Ali
(74) *Attorney, Agent, or Firm* — Grüneberg and Myers PLLC

(57) ABSTRACT

An aqueous oil-in-water emulsion containing a propylethoxysilane oligomer mixture or a mixture of a propylethoxysilane oligomer mixture and octyltriethoxysilane in a weight ratio of 3:1 to 1:3, at least one emulsifier or an emulsifier system, at least one content of a 2-aminoethanol and water is used as an addition in the production of hydraulically setting cement mixtures such as mortar, screed or concrete for reduction of the shrinkage characteristics.

12 Claims, No Drawings

USE OF AQUEOUS EMULSIONS BASED ON PROPYLETHOXYSILANE OLIGOMERS AS AN ADDITIVE IN HYDRAULICALLY SETTING CEMENT COMPOSITIONS FOR REDUCTION OF SHRINKAGE CHARACTERISTICS

BACKGROUND OF THE INVENTION

Field of the Invention

The present invention relates to the use of specific aqueous emulsions based on propylethoxysilane oligomers as an addition in hydraulically setting cement mixtures, such as cement, screed or mortar, for reduction of shrinkage characteristics.

Description of the Related Art

Hydraulically setting cement mixtures are generally understood by the person skilled in the art to mean mortar, screed and concrete. These mixtures contain cement as the primary binder and additionally aggregates comprising— preferably but not exclusively—sand, gravel, limestone or chalk, having different maximum particle size and particle size distribution. In general, hydraulically setting cement mixtures are referred to as mortar when the maximum particle size of the aggregates is below 4 mm, as screeds when it is up to 8 mm, and as concretes when it is greater than 8 mm. Regardless of this, cement mixtures that are hydraulically setting in this respect, with regard to their application, contain water and may also contain further additives, admixtures and/or further mineral additions having hydraulic effects, for example—but not exclusively— pozzolans or fly ash, for specific applications.

Aqueous emulsions of alkoxysilanes and/or organopolysiloxanes and any further starting materials, various preparation routes and the various application options therefor are described in a multitude of publications.

For instance, emulsions of alkoxysilanes and organopolysiloxanes are especially used for hydrophobization of mineral building materials and wood, as adhesion promoters, as anticorrosives, for example for reinforced concrete, and in paints or impregnating compositions for building materials: EP 0442098, U.S. Pat. No. 5,746,810, 6,103,001, WO 00/3406, EP 0761724, U.S. Pat. No. 5,591,818, EP 0590270, U.S. Pat. No. 5,073,195, 3,734,763, CN 103923561, CN 103964736, U.S. Pat. No. 6,174,461, EP 0957071, EP 1308428, WO 2006/081891, WO 2006/081892, WO 2008/128819, EP 0616989, EP 0538555, EP 0819665, WO 2000/046167, etc.

EP 1236702 relates to waterglass-containing building material mixtures for the production of chemical-resistant mortars, where it is also possible to add hydrophobizing agents among other materials.

EP 2429968 discloses alkali metal-activated alumina silica binders for reduction of shrinkage, comprising at least one organic compound from the group of the amines and/or salts thereof, with exclusion of the use of amino alcohols among other substances.

In the production of mouldings or shaped bodies, for example concrete floors, concrete walls, bridges, from cement-based building material mixtures, it is necessary to avoid cracks in the hardening operation, and in this regard to provide (expansion) joints for compensation. Thus, efforts are made to minimize the shrinkage characteristics of such building material mixtures.

SUMMARY OF THE INVENTION

The problem addressed by the present invention was that of providing an aqueous emulsion of functional alkylalkoxysilanes and the condensed alkylalkoxysilane oligomers thereof (also called oligomers or oligomer mixture for short hereinafter), which, as a result of addition in the production of hydraulically setting cement mixtures, such as concrete, screed or mortar, results in lower shrinkage before hardening.

The problem is solved by using an aqueous emulsion, comprising:
a propylethoxysilane oligomer mixture or a mixture of a propylethoxysilane oligomer mixture and octyltriethoxysilane in a weight ratio of 3:1 to 1:3,
at least one emulsifier or an emulsifier system,
at least one content of a 2-aminoethanol, and
water.

In one embodiment, the invention relates to a hydraulically setting cement mixture, comprising:
the above aqueous emulsion.

In another embodiment, the present invention relates to a method for reducing of a shrinkage characteristic of a hydraulically setting cement mixture, said method comprising:
adding the above aqueous emulsion to said a hydraulically setting cement mixture;
wherein said shrinkage characteristic of said hydraulically setting cement mixture is reduced compared to the shrinkage characteristic in a standard mortar according to EN 196 as measured according to DIN EN 52450, 1985-08, using measuring instrument B of the DIN procedure.

DETAILED DESCRIPTION OF THE INVENTION

It has thus been found that, surprisingly, an aqueous emulsion comprising a propylethoxysilane oligomer mixture or a mixture of a propylethoxysilane oligomer mixture and octyltriethoxysilane (OCTEO), wherein propylethoxysilane oligomer mixture and octyltriethoxysilane are present in a weight ratio of 3:1 to 1:3, at least one emulsifier or an emulsifier system, at least one content of a 2-aminoethanol, preferably an N-alkyl-substituted 2-aminoethanol, more preferably N,N-diethyl-2-aminoethanol, and water, as an addition in the production of hydraulically setting cement mixtures [also called cement mixture(s) for short hereinafter], especially selected from the group of mortar, screed and concrete, for example porous concrete, reinforced concrete, underwater concrete, textile fibre concrete, concrete repair mortar, mortar, 2-component mortars, screed—to name just a few—can be used advantageously to reduce shrinkage characteristics. Standard mortar served here as model substance; cf. the use examples cited hereinafter.

The solution to the problem addressed by the invention also includes exceptional economic viability with regard to the oil phase in production of specific emulsions, since it is advantageously possible to use, in place of the silane oligomer which is difficult to prepare, i.e. is costly, proportions of less costly monomeric alkylalkoxysilane in the form of OCTEO.

The invention thus provides for the use of an aqueous emulsion containing a propylethoxysilane oligomer mixture or a mixture of a propylethoxysilane oligomer mixture and octyltriethoxysilane in a weight ratio of 3:1 to 1:3, at least one emulsifier or an emulsifier system, at least one content of a 2-aminoethanol and water as an addition in the production of hydraulically setting cement mixtures for reduction of shrinkage characteristics.

Furthermore, it is explicitly pointed out that the disclosure relating to the subject-matter of the present invention includes all combinations of individual features of the present or subsequent description of the invention and of the invention as claimed.

The preparation of propylethoxysilane oligomer mixtures (also referred to hereinafter as propylethoxysilane oligomers for short), especially of n- or i-propylethoxysilane oligomers, can be effected, for example, according to EP 0 814 110, EP 1 205 481 or EP 1 205 505.

The preparation of an aqueous emulsion used in accordance with the invention, comprising, at least as the oil phase, a propylethoxysilane oligomer mixture or a mixture of propylethoxysilane oligomer mixtures and octyltriethoxysilane and a 2-aminoethanol or N-alkyl-substituted 2-aminoethanol, at least one emulsifier and water can be effected for example—but not exclusively—by premixing of the constituents and subsequent emulsification (in this regard, see also, inter alia, WO 2006/081891, WO 2006/081892, WO 2008/128819 and EP 0538555), wherein the addition of the 2-aminoethanol or N-alkyl-substituted 2-aminoethanol can be effected in the base mixture either before or after the emulsification.

An emulsion used in accordance with the invention preferably has a content of propylethoxysilane oligomer mixture of 20% to 85% by weight, based on the total weight of the emulsion, where the oil phase totals 40% to 85% by weight, especially 41% to 82% by weight, based on the total weight of the emulsion.

Especially preferred are propylethoxysilane oligomer mixtures which contain oligomers of the formula (I)

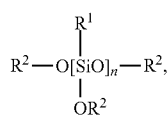

and the $R^1$ groups are independently n- and i-propyl and the $R^2$ groups are ethyl and n determines the oligomerization level at 2 to 20.

Also preferred are emulsions used in accordance with the invention that contain 0.1% to 1% by weight, preferably 0.25% to 0.75% by weight, based on the total weight of the emulsion, of at least one 2-aminoethanol of the general formula (II)

$$HO\text{—}CH_2\text{—}CH_2\text{—}NR^3_2 \qquad (II)$$

in which $R^3$ groups are the same or different and are independently hydrogen, methyl and ethyl, with especial preference for N,N-diethyl-2-aminoethanol.

It is also possible to additionally adjust the content of oligomer or silane/oligomer oil phase by addition of a suitable organic solvent, for example—but not exclusively—aliphatic and aromatic hydrocarbons having a boiling point above room temperature, such as $C_6$- to $C_{12}$-alkanes, petroleum, white spirit, diesel, kerosene, toluene, xylene, alcohols or polyols, such as pentanol, hexanol, octanol, nonanol, isononanol, glycerol, ethers, esters, aldehydes, ketones or a mixture of at least two of the aforementioned organic solvents.

The emulsions used in accordance with the invention contain at least one emulsifier, preferably an emulsifier system composed of two or more emulsifiers. The emulsifier(s) may be present in amounts of 0.02% to 3% by weight, based on the total weight of the emulsion.

Suitable emulsifiers or emulsifier systems, where emulsifier systems are based on at least two of the emulsifiers which follow, are selected by way of example from alkyl sulphates having $C_8$-$C_{18}$-alkyl, alkyl ether sulphates and alkaryl ether sulphates having $C_8$-$C_{18}$-alkyl in the hydrophobic radical and having 1 to 40 ethylene oxide (EO) and/or propylene oxide (PO) units, alkylsulphonates having $C_8$-$C_{18}$-alkyl, sodium laurylsulphate ($C_{12}$-$C_{16}$), alkarylsulphonates having $C_8$-$C_{18}$-alkyl, monoesters of sulphosuccinic acid with monohydric alcohols or alkylphenols having 5 to 15 carbon atoms, alkali metal and ammonium salts of carboxylic acids having 8 to 20 carbon atoms in the alkyl, aryl, alkaryl or aralkyl radical, alkyl and alkaryl phosphates having 8 to 20 carbon atoms in the organic radical, alkyl ether or alkaryl ether phosphates having 8 to 20 carbon atoms in the alkyl or alkaryl radical and 1 to 40 EO units, alkyl polyglycol ethers and alkaryl polyglycol ethers having 8 to 40 EO units and $C_8$-$C_{20}$ carbon atoms in the alkyl or aryl radicals, ethylene oxide/propylene oxide (EO/PO) block copolymer having 8 to 40 EO and/or PO units, addition products of alkylamines having $C_8$-$C_{22}$-alkyl radicals with ethylene oxide or propylene oxide, alkyl polyglycosides having linear or branched, saturated or unsaturated $C_8$-$C_{24}$-alkyl radicals and oligoglycoside radicals having 1 to 10 hexose or pentose units, silicon-functional surfactants or mixtures of these emulsifiers. Examples of silicon-functional surfactants are those of the general formulae

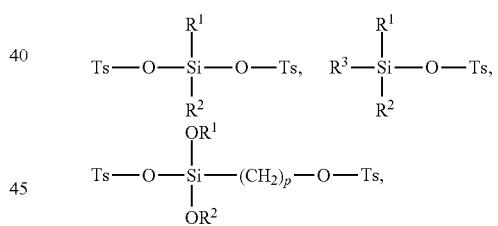

in which $R^1$ and $R^2$ are the same or different, straight-chain or branched $C_1$-$C_{20}$-alkyl, preferably $C_1$-$C_{10}$-alkyl, phenyl, $R^3$ is $C_1$-$C_{10}$-alkyl, p is an integer from 0 to 3 and Ts is a surfactant radical selected from

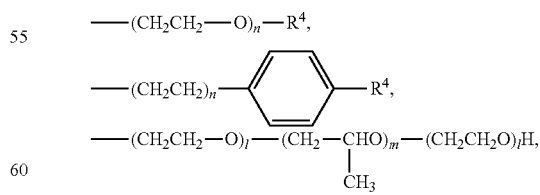

in which n is an integer from 3 to 15, m is an integer from 3 to 50 and l is an integer from 3 to 25, $R^4$ is H, $C_2$-$C_{36}$-alkenyl, $C_5$-$C_8$-cycloalkyl, $C_7$-$C_{36}$-aralkyl (also called "silicon-functional surfactant" or "silicon-functional type A emulsifier" hereinafter for short).

Particular preference is given to a combination of alkyl sulphates having $C_8$-$C_{18}$-alkyl radicals, for example of lauryl sulphates, and silicon-functional surfactants of the formula

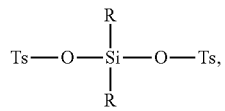

in which R is methyl, ethyl, methoxy or ethoxy, and the surfactant radical is

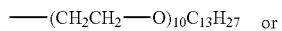

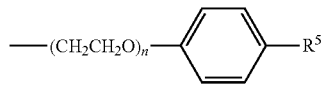

where, in the formula, n is an integer from 5 to 15 and $R^5$ is a straight-chain or branched $C_6$-$C_{10}$-alkyl radical. A particularly suitable surfactant is one of the above formulae in which $R=CH_3$, n=1 to 30 and $R^5$=isononyl. This surfactant is referred to hereinafter as surfactant A.

In addition to the silane-based active ingredient(s), water and the at least one emulsifier, the aqueous emulsions used in accordance with the invention may also contain customary auxiliaries selected from inorganic or organic acids, fatty acids, bases, buffer substances, fungicides, bactericides, algicides, microbicides, odourants, corrosion inhibitors, preservatives, rheology aids, for example fumed silica or bentonites, drip-off aids, for example waxes, fluoropolymers, hydrophobic fumed silicas, those based on reactive organosiloxanes, silicone resins, catalysts, for example organic tin, titanium or zirconium compounds such as dibutyltin dilaurate, titanium alkoxides or zirconium alkoxides (e.g. tetrabutyl titanate). The auxiliaries may be present in amounts of 0.005% to 10% by weight, based on the total weight of the emulsion.

The desired pH can additionally be established by addition of acid or alkaline compounds or by means of common buffer systems, such as $NaHCO_3$, sodium acetate/acetic acid or alkali metal phosphates, and can be determined by means of standard methods as known to the person skilled in the art, for example by means of pH paper or pH strips (from Merck) or a pH electrode. For instance, an emulsion used in accordance with the invention preferably has a pH of 8 to 12.

In addition, in the production of emulsions used in accordance with the invention, it is advantageous to use at least one further additive selected from the group of preservatives, such as CIT or MIT (CIT=chloromethylisothi- azolinone; MIT=methylisothiazolinone), anticorrosion aids, drip-off aids, such as reactive siloxane resin or organopolysiloxane, rheology aids, sodium hydrogencarbonate.

In general, a present emulsion is used in accordance with the invention in hydraulically setting cement mixtures by, during the production of an applicable mortar, screed or cement in a mixer, adding the emulsion in one dose or in portions and incorporating it substantially homogeneously by mixing; alternatively, the emulsion can be initially charged or added together with the make-up water.

According to the invention, one of the present emulsions is used to an extent of 0.1% to 5% by weight, preferably 0.5% to 2% by weight, based on the amount of cement present in the cement mixture, the cement mixture preferably being a concrete mixture.

Thus, an emulsion used in accordance with the invention advantageously features reduced shrinkage during or until the hardening of hydraulically setting cement mixtures, i.e. in the case of mortar, screed and especially in the case of concrete, such as porous concrete, underwater concrete, reinforced concrete, textile fibre concrete. For example, an inventive use is advantageous with regard to required expansion joints in the case of relatively large concrete areas, for example in the case of bridges; for instance, the shrinkage over a length of 100 m after 28 days can be reduced from a shrinkage of 7.5 cm in the case of standard mortar to 6.6 cm in the case of an inventive use, which is also taken into consideration in structural and economic considerations. Moreover, lower shrinkage characteristics in the case of cement mixtures also have the advantage that there are lower internal stresses in such systems, and hence the tendency to cracking and loss of adhesion extending as far as flaking can be distinctly reduced.

The inventive use of the present specific emulsions is particularly advantageous as an addition in hydraulically setting cement mixtures, especially in concrete, porous concrete, underwater concrete, reinforced concrete, textile concrete or textile fibre concrete, screed, mortar, 2-component mortar, concrete repair mortar—to name just a few examples. In the case of a 2-component mortar, the second component is added in liquid form to the first component (generally a dry mortar mixture) directly prior to application; this second component may comprise—but not exclusively—suitable epoxy resins for increasing the chemical resistance or polymer latex emulsions known to those skilled in the art for increasing the elasticity of the hydraulically setting cement mixture. In addition, emulsions used in accordance with the invention likewise advantageously have a hydrophobizing and corrosion-inhibiting effect, the latter especially in reinforced concrete.

The invention is elucidated in detail by the examples which follow, without restricting the subject-matter of the present invention.

Having generally described this invention, a further understanding can be obtained by reference to certain specific examples which are provided herein for purposes of illustration only, and are not intended to be limiting unless otherwise specified.

EXAMPLES

Example 1 (Comparative Emulsion without Propylethoxysilane Oligomer)

Production of the emulsion proceeding from:

| | |
|---|---|
| 49.0 | kg demineralized water, |
| 49.0 | kg n-octyltriethoxysilaue (Dynasylan ® OCTEO, Evonik) |
| 0.96 | kg silicon-functional type A emulsifier (Evonik), |
| 0.64 | kg Sulfopon 101 (BASF), |
| 0.1 | kg preservative CIT/MIT *), |
| 0.08 | kg $NaHCO_3$ |

For this purpose, demineralized water was initially charged, and the soluble constituents of the composition were dissolved while stirring over 5 to 10 minutes, and then the octyltriethoxysilane was mixed in. This was followed by emulsification in a high-pressure homogenizer (Kryomat setting to +3° C.) over the course of 25 minutes (to 150 bar). *) CIT=chloromethylisothiazolinone; MIT=methylisothiazolinone Example 2 (Emulsion for Inventive Use)

Production of base mixture 1 by:

| Initial charge of demineralized water | 200.0 g, |
|---|---|
| Addition of Sulfopon 101 (BASF) | 9.0 g, |
| Lutensol TO 5 (BASF) | 28.0 g, |
| Acticide RS (from Thor) | 2.6 g, |
| NaHCO₃ | 1.4 g |
| and vigorous mixing over 10 to 15 minutes. | |

The base mixture 1 was transferred into a high-pressure homogenizer, and 759.0 g of demineralized water, 750.0 g of n-propylethoxysilane oligomer (also referred to hereinafter as "PTEO oligomer", prepared according to Example 1 from EP1205505), 250.0 g of n-octyltriethoxysilane (Dynasylan® OCTEO) and 10.0 g of N,N-diethyl-2-aminoethanol were added, followed by premixing while stirring (284 rpm) over 35 minutes and emulsification over 7 minutes (to 160 bar). The Kryomat was set here to ±3° C.

Example 3 (Emulsion for Inventive Use)

Production of base mixture 2 by:

| Initial charge of demineralized water | 200.0 g, |
|---|---|
| Addition of Sulfopon 101 (BASF) | 9.0 g, |
| Lutensol TO 5 (BASF) | 28.0 g, |
| Acticide RS (from Thor) | 2.6 g, |
| NaHCO₃ | 1.4 g |
| and vigorous mixing over 10 to 15 minutes. | |

The base mixture 2 was transferred into a high-pressure homogenizer, and 759.0 g of demineralized water, 500.0 g of n-propylethoxysilane oligomer (prepared according to Example 1 from EP1205505), 500.0 g of n-octyltriethoxysilane (Dynasylan® OCTEO) and 10.0 g of N,N-diethyl-2-aminoethanol were added, followed by premixing while stirring (284 rpm) over 33 minutes and emulsification over 9 minutes (to 150 bar). The Kryomat was set here to +3° C.

Example 4 (Emulsion for Inventive Use)

Production of base mixture 2 by:

| Initial charge of demineralized water | 200.0 g, |
|---|---|
| Addition of Sulfopon 101 (BASF) | 9.0 g, |
| Lutensol TO 5 (BASF) | 28.0 g, |
| Acticide RS (from Thor) | 2.6 g, |
| NaHCO₃ | 1.4 g |
| and vigorous mixing over 10 to 15 minutes. | |

The base mixture 3 was transferred into a high-pressure homogenizer, and 759.0 g of demineralized water, 250.0 g of n-propylethoxysilane oligomer (prepared according to Example 1 from EP1205505), 750.0 g of n-octyltriethoxysilane (Dynasylan® OCTEO) and 10.0 g of N,N-diethyl-2-aminoethanol were added, followed by premixing while stirring (284 rpm) over 38 minutes and emulsification over 5 minutes (to 150 bar). The Kryomat was set here to +3° C.

Example 5 (Emulsion for Inventive Use)

First of all, production of the base emulsion proceeding from:

| 48.1 | kg demineralized water, |
|---|---|
| 49.2 | kg n-propylethoxysilane oligomer, according to Example 1 from EP1205505, |
| 0.96 | kg silicon-functional type A emulsifier (Evonik), |
| 0.64 | kg Sulfopon 101 (BASF), |
| 0.1 | kg preservative CIT/MIT, |
| 0.08 | kg NaHCO₃ |

For this purpose, demineralized water was initially charged, and the soluble constituents of the composition were dissolved while stirring over 5 to 10 minutes, and then the n-propylethoxysilane oligomer and 0.49 kg of N,N-diethyl-2-aminoethanol were mixed in. This was followed by emulsification in a high-pressure homogenizer (Kryomat setting to +3° C.) over the course of 25 minutes (to 150 bar).

Example 6 (Comparative Examples Relating to Shrinkage Characteristics in Standard Mortar)

Shrinkage characteristics in what is called standard mortar according to EN 196 were examined in a comparative manner here according to DIN EN 52450 (1985-08, using measuring instrument B). For this purpose, standard mortars (water/cement factor constant at 0.5) were produced in the standard manner, using the emulsions made from the above-cited Examples 1 to 5, with the amount of emulsion used in the case of emulsion-containing standard mortar at 3.0% by weight in each case, based on the amount of cement. The shrinkage values were determined after 1, 4, 14 and 28 days and can be found in Table 1.

TABLE 1

Study results for shrinkage characteristics in EN 196 standard mortar according to DIN EN 52450

| | Shrinkage values in [mm/m] | | | |
|---|---|---|---|---|
| Composition for standard mortar | After 1 day | After 4 days | After 14 days | After 28 days |
| Reference (no emulsion) | −0.05 | −0.27 | −0.60 | −0.75 |
| (Comparative) Example 1 (emulsion with OCTEO, without "PTEO oligomer", without DEAE) | −0.13 | −0.29 | −0.66 | −0.78 |
| Example 2 (emulsion with OCTEO and "PTEO oligomer", ratio 1:3, with DEAE) | −0.01 | −0.16 | −0.49 | −0.66 |
| Example 3 (emulsion with OCTEO and "PTEO oligomer", ratio 1:1, with DEAE) | −0.03 | −0.21 | −0.59 | −0.70 |
| Example 4 (emulsion with OCTEO and "PTEO oligomer", ratio 3:1, with DEAE) | −0.05 | −0.18 | −0.57 | −0.68 |

TABLE 1-continued

Study results for shrinkage characteristics in
EN 196 standard mortar according to DIN EN 52450

| Composition for standard mortar | Shrinkage values in [mm/m] | | | |
|---|---|---|---|---|
| | After 1 day | After 4 days | After 14 days | After 28 days |
| Example 5 (emulsion with "PTEO oligomer", with DEAE) | −0.05 | −0.24 | −0.55 | −0.62 |

(OCTEO = octyltriethoxysilane; "PTEO oligomer" = n-propylethoxysilane oligomer; DEAE = NN-diethyl-2-aminoethanol)

Summary of the Results from the Performance Studies:

The application tests show that the addition of an aqueous emulsion based on a propyl-/alkoxysilane oligomer and N,N-diethyl-2-aminoethanol in what is called standard mortar leads to a distinct reduction in shrinkage; cf. the shrinkage values for Example 5 compared to the reference values.

It is also advantageously possible to replace propyl-/alkoxysilane oligomer in the oil phase of such an emulsion partly with a less costly monomeric alkylalkoxysilane; cf. Examples 2, 3 and 4 compared to the reference values.

By contrast, aqueous emulsions based exclusively on a purely monomeric alkylalkoxysilane with regard to the oil phase do not show any reduction in shrinkage on application in standard mortar; cf. (Comparative) Example 1 compared to the reference values and the inventive uses.

European patent application 16169271.0 filed May 12, 2016, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. An aqueous emulsion, comprising:
a propylethoxysilane oligomer mixture or a mixture of a propylethoxysilane oligomer mixture and octyltriethoxysilane in a weight ratio of 3:1 to 1:3,
at least one emulsifier or an emulsifier system,
at least one content of N,N-diethyl-2-aminoethanol, and water,
wherein said emulsion has a pH of 8 to 12; and
wherein, when added to a cement mixture, shrinkage of a hardened cement mixture is reduced relative to a hardened cement mixture which does not contain said emulsion
wherein the emulsion has a content of propylethoxysilane oligomer mixture of 20% to 85% by weight, based on the total weight of the emulsion, wherein an oil phase totals 40% to 85% by weight, based on the total weight of the emulsion.

2. The aqueous emulsion according to claim 1, wherein the propylethoxysilane oligomer mixture contains oligomers of the formula (I)

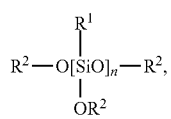

wherein
the $R^1$ groups are independently n- and i-propyl,
the $R^2$ groups are ethyl, and
n determines the oligomerization level at 2 to 20.

3. The aqueous emulsion according to claim 1, wherein the emulsion contains 0.1% to 1% by weight, based on the total weight of the emulsion, of N,N-diethyl-2-aminoethanol.

4. The aqueous emulsion according to claim 1, wherein the emulsion comprises at least one further additive selected from the group consisting of preservatives, anticorrosion aids, drip-off aids, rheology aids, sodium hydrogencarbonate.

5. The aqueous emulsion according to claim 1, wherein the emulsifier or the emulsifier system which is based on at least two of the emulsifiers which follow is selected from the group consisting of alkyl sulphates having $C_8$-$C_{18}$-alkyl, alkyl ether sulphates and alkaryl ether sulphates having $C_8$-$C_{18}$-alkyl in the hydrophobic radical and having 1 to 40 ethylene oxide (EO) and/or propylene oxide (PO) units, alkylsulphonates having $C_8$-$C_{18}$-alkyl, sodium laurylsulphate ($C_{12}$-$C_{16}$), alkarylsulphonates having $C_8$-$C_{18}$-alkyl, and monoesters of sulphosuccinic acid with monohydric alcohols or alkylphenols having 5 to 15 carbon atoms, alkali metal and ammonium salts of carboxylic acids having 8 to 20 carbon atoms in the alkyl, aryl, alkaryl or aralkyl radical, alkyl and alkaryl phosphates having 8 to 20 carbon atoms in the organic radical, alkyl ether or alkaryl ether phosphates having 8 to 20 carbon atoms in the alkyl or alkaryl radical and 1 to 40 EO units, alkyl polyglycol ethers and alkaryl polyglycol ethers having 8 to 40 EO units and $C_8$-$C_{20}$ carbon atoms in the alkyl or aryl radicals, ethylene oxide/propylene oxide (EO/PO) block copolymer having 8 to 40 EO and/or PO units, addition products of alkylamines having $C_8$-$C_{22}$-alkyl radicals with ethylene oxide or propylene oxide, alkyl polyglycosides having linear or branched, saturated or unsaturated $C_8$-$C_{24}$-alkyl radicals and oligoglycoside radicals having 1 to 10 hexose or pentose units, silicon-functional surfactants or mixtures of two or more of these emulsifiers.

6. The aqueous emulsion according to claim 1, wherein the emulsifier or emulsifier system is a mixture of at least one anionic emulsifier and at least one nonionic emulsifier which is present in an amount of 0.02% to 3% by weight, based on the total weight of the emulsion.

7. The aqueous emulsion according to claim 1, wherein the emulsion is used to an extent of 0.1% to 5% by weight, based on the amount of cement present in the cement mixture.

8. The aqueous emulsion according to claim 1, wherein the hydraulically setting cement mixture is a mortar, screed or concrete.

9. A hydraulically setting cement mixture, comprising:
the aqueous emulsion according to claim 1.

10. The hydraulically setting cement mixture according to claim 9, which is selected from the group consisting of mortar, screed and concrete.

11. The hydraulically setting cement mixture according to claim 9, which is selected from the group consisting of porous concrete, reinforced concrete, underwater concrete, textile fiber concrete, concrete repair mortar, mortar, 2-component mortars and screed.

12. A method for reducing of a shrinkage characteristic of a hydraulically setting cement mixture, said method comprising:
adding the aqueous emulsion according to claim 1 to a hydraulically setting cement mixture;
wherein said shrinkage characteristic of said hydraulically setting cement mixture is reduced compared to the shrinkage characteristic in a standard mortar according to EN 196 as measured according to DIN EN 52450, 1985-08, using measuring instrument B of the DIN procedure.

\* \* \* \* \*